United States Patent
Hong

(10) Patent No.: US 12,543,151 B2
(45) Date of Patent: Feb. 3, 2026

(54) METHODS AND APPARATUSES FOR SENDING INFORMATION, AND STORAGE MEDIA

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 362 days.

(21) Appl. No.: 18/035,611

(22) PCT Filed: Nov. 6, 2020

(86) PCT No.: PCT/CN2020/127025
§ 371 (c)(1),
(2) Date: May 5, 2023

(87) PCT Pub. No.: WO2022/094907
PCT Pub. Date: May 12, 2022

(65) Prior Publication Data
US 2024/0015695 A1    Jan. 11, 2024

(51) Int. Cl.
*H04W 68/02* (2009.01)
*H04W 76/20* (2018.01)

(52) U.S. Cl.
CPC ........... *H04W 68/02* (2013.01); *H04W 76/20* (2018.02)

(58) Field of Classification Search
CPC .............................. H04W 68/02; H04W 76/20
USPC ....................................................... 455/458
See application file for complete search history.

(56) References Cited

U.S. PATENT DOCUMENTS

| 10,856,350 | B2 | 12/2020 | Qiu et al. |
| 2013/0065570 | A1 | 3/2013 | Jung et al. |
| 2019/0230731 | A1 | 7/2019 | Park et al. |
| 2020/0037380 | A1 | 1/2020 | Qiu et al. |

(Continued)

FOREIGN PATENT DOCUMENTS

| CN | 107690134 A | 2/2018 |
| CN | 109792674 A | 5/2019 |

(Continued)

OTHER PUBLICATIONS

Intel, Verizon, AT&T, Sony, MediaTek Inc., "Paging cause introduction", SA WG2 Meeting #129-BIS, S2-1812350, Nov. 26-30, 2018, West Palm Beach, FL, US, 8 pages.

(Continued)

*Primary Examiner* — Joel Ajayi
(74) *Attorney, Agent, or Firm* — Volpe Koenig

(57) ABSTRACT

The present disclosure provides methods and apparatuses for sending information, and storage media. The method for sending information includes: in response to determining that a first SIM is in service communication and receiving a paging message for paging a second SIM in an inactive state sent by a target base station through paging signaling, determining whether to perform a paging response, where the target base station is a base station covering an area where the second SIM is currently located; and in response to determining not to perform a paging response, sending target indication information to the target base station by the second SIM, where the target indication information is for informing a network side that the second SIM has received the paging message, but does not perform a paging response.

8 Claims, 10 Drawing Sheets

(56) References Cited

U.S. PATENT DOCUMENTS

| | | |
|---|---|---|
| 2020/0205203 A1 | 6/2020 | Hong |
| 2020/0245292 A1 | 7/2020 | Huang et al. |
| 2021/0076440 A1 | 3/2021 | Qiu et al. |

FOREIGN PATENT DOCUMENTS

| | | |
|---|---|---|
| CN | 110214462 A | 9/2019 |
| CN | 110505687 A | 11/2019 |
| CN | 110945883 A | 3/2020 |
| CN | 111263437 A | 6/2020 |
| CN | 111278107 A | 6/2020 |
| CN | 111602437 A | 8/2020 |
| CN | 111771406 A | 10/2020 |
| CN | 111837411 A | 10/2020 |
| KR | 20170141095 A | 12/2017 |
| WO | 2018/028677 A1 | 2/2018 |
| WO | 2018176675 A1 | 10/2018 |
| WO | 2020/215273 A1 | 10/2020 |

OTHER PUBLICATIONS

ISA State Intellectual Property Office of the People's Republic of China, Written Opinion of the International Searching Authority Issued in Application No. PCT/CN2020/127025, Jul. 2, 2021, WIPO, 7 pages.

ISA State Intellectual Property Office of the People's Republic of China, International Search Report Issued in Application No. PCT/CN2020/127025, Jul. 2, 2021, WIPO, 5 pages.

State Intellectual Property Office of the People's Republic of China, Office Action and Search Report Issued in Application No. 202080003115X, Oct. 8, 2022, 13 pages.(Submitted with Machine/Partial Translation).

Sony et al., "Discussion on Multi-SIM", 3GPP TSG-RAN WG2 Meeting #112 e Online, R2-2009885, Oct. 23, 2020, 11 pages.

METHODS AND APPARATUSES FOR SENDING INFORMATION, AND STORAGE MEDIA

CROSS REFERENCE TO RELATED APPLICATIONS

This application is the national phase of International Application No. PCT/CN2020/127025 filed on Nov. 6, 2020, the disclosure of which is hereby incorporated by reference in its entirety.

BACKGROUND

With the development of wireless communication technology, there are more and more multi-SIM terminals. At present, the processing methods for multi-SIM terminals are mainly based on the implementation of various terminal manufacturers, which leads to many different terminal behaviors and processing methods, such as dual-SIM single-standby, dual-SIM dual-standby single-pass, dual-SIM dual-standby dual-pass.

At present, when one of subscriber identity modules (SIMs) in a connected state of a multi-SIM terminal is communicating with a first system, if the other SIM in an idle state receives paging signaling sent by a second system, in order to not affect the communication with the first system, a network side can be informed that the other SIM has received a paging message, but decides not to perform a paging response.

However, the above situation does not take into account a SIM in an inactive state on a multi-SIM terminal.

SUMMARY

The present disclosure relates to the field of communication, and in particular to methods and apparatuses for sending information, and storage media.

To overcome the problems existing in the related art, the embodiments of the present disclosure provide methods and apparatuses for sending information, and storage media.

According to a first aspect of the embodiments of the present disclosure, there is provided a method for sending information applied to a multi-SIM terminal, including: in response to determining that a first subscriber identity module (SIM) is in service communication and receiving a paging message for paging a second SIM in an inactive state sent by a target base station through paging signaling, determining whether to perform a paging response; where the target base station is a base station covering an area where the second SIM is currently located; and in response to determining not to perform a paging response, sending target indication information to the target base station by the second SIM; where the target indication information is for informing a network side that the second SIM has received the paging message, but does not perform a paging response.

According to a second aspect of the embodiments of the present disclosure, there is provided a method for sending information applied to a target base station, which is a base station covering an area where a second subscriber identity module (SIM) in an inactive state on a multi-SIM terminal is currently located. The method includes: sending a paging message for paging the second SIM in the inactive state on the multi-SIM terminal to the second SIM through paging signaling; and in response to receiving target indication information sent by the second SIM, sending the target indication information to a target network device; where the target indication information is for informing a network side that the second SIM has received the paging message, but does not perform a paging response.

According to a third aspect of the embodiments of the present disclosure, there is provided a method for sending information applied to an anchor base station corresponding to a second subscriber identity module (SIM) in an inactive state on a multi-SIM terminal. The method includes: receiving target indication information; where the target indication information is for informing a network side that the second SIM has received a paging message, but does not perform a paging response; and sending the target indication information to a core network device.

According to a fourth aspect of the embodiments of the present disclosure, there is provided an apparatus for sending information, including: a processor; and a memory configured to store instructions executable by the processor; where the processor is configured to perform the method for sending information according to any one of the first aspects.

According to a fifth aspect of the embodiments of the present disclosure, there is provided an apparatus for sending information, including: a processor; and a memory configured to store instructions executable by the processor; where the processor is configured to perform the method for sending information according to any one of the second aspects or the third aspects.

It should be understood that the above general descriptions and subsequent detailed descriptions are merely illustrative and explanatory, and shall not constitute limitation to the present disclosure.

BRIEF DESCRIPTION OF THE DRAWINGS

The accompanying drawings, which are incorporated in and constitute a part of this specification, illustrate examples consistent with the present disclosure, and together with the description, serve to explain the principles of the disclosure.

DETAILED DESCRIPTION OF THE EMBODIMENTS

Exemplary embodiments will be described in detail herein, examples of which are illustrated in the accompanying drawings. When the following descriptions involve the drawings, like numerals in different drawings refer to like or similar elements unless otherwise indicated. Implementations described in the following exemplary embodiments do not represent all implementations consistent with the present disclosure. Rather, they are merely examples of apparatuses and methods consistent with some aspects of the present disclosure as detailed in the appended claims.

Terms used in the embodiments of the present disclosure are for the purpose of describing specific embodiments only, and are not intended to limit the present disclosure. The singular forms "a", "an" and "this" used in the embodiments of the present disclosure and the appended claims are also intended to include plural forms, unless the context clearly indicates other meanings. It should also be understood that the term "and/or" as used herein refers to and includes any and all possible combinations of one or more of the associated listed items.

It should be understood that although terms first, second, third, etc. may be used in the embodiments of the present disclosure to describe various information, such information should not be limited to these terms. These terms are only used to distinguish the same type of information from each other. For example, first information may also be referred to as second information, and similarly, the second information may also be referred to as the first information without departing from the scope of the present disclosure. Depending on the context, the word "if" as used herein can be interpreted as "at the time of", "when" or "in response to determining".

The methods for sending information provided by the present disclosure will be introduced from a multi-SIM terminal side. The multi-SIM terminal is a terminal that supports the installation of two or more subscriber identity modules (SIMs).

Figure 1:
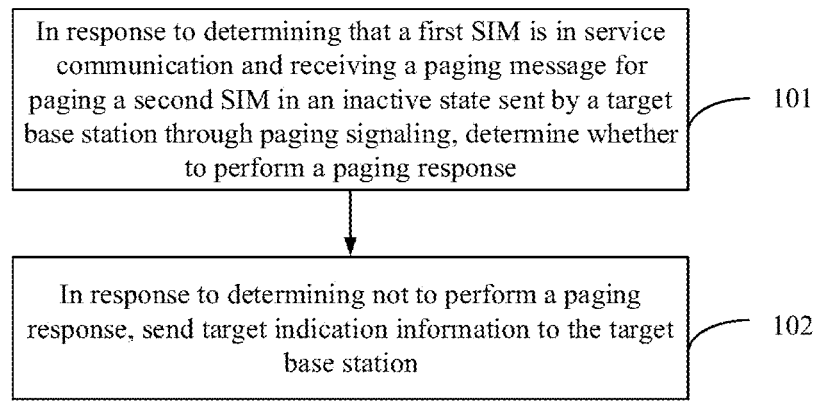
FIG. 1 is a flowchart illustrating a method for sending information according to an exemplary embodiment.

An embodiment of the present disclosure provides a method for sending information, as shown in FIG. 1. FIG. 1 is a flowchart of a method for sending information according to an embodiment. The method can be applied to a multi-SIM terminal, and can include the following steps 101 and 102.

In step 101, in response to determining that a first SIM is in service communication and receiving a paging message for paging a second SIM in an inactive state sent by a target base station through paging signaling, whether to perform a paging response is determined.

In the embodiment of the present disclosure, the first SIM is a SIM in service communication on the multi-SIM terminal, the second SIM is a SIM in an inactive state on the multi-SIM terminal, and the target base station is a base station covering an area where the second SIM is currently located.

When a terminal (the second SIM in the embodiment of the present disclosure) enters the inactive state, the last serving base station stores the context of the terminal and connection information of a NG interface between the last serving base station and a service core network. An access stratum (AS) of the terminal also stores corresponding context information, including a bearer, an identifier of the inactive state, a home area, etc. In this way, the base station can page to the terminal in the inactive state through a wireless access network paging mechanism within a configured area. The terminal can quickly resume data transmission based on the context information stored on the terminal side and the base station side, achieving low latency transmission.

In the embodiment of the present disclosure, if the first SIM is in service communication and a paging message for paging the second SIM in the inactive state sent by the target base station through paging signaling is received, the multi-SIM terminal can determine whether to perform a paging response based on service needs.

In an example, in order not to affect the communication of the first SIM, the multi-SIM terminal can determine not to perform a paging response.

In another example, if a service priority corresponding to the ongoing service of the first SIM is higher than a service priority corresponding to the service of paging the second SIM, the multi-SIM terminal can determine not to perform a paging response. If the situation is contrary to the above situation, the multi-SIM terminal can determine that performing a paging response is needed.

In another example, if performing a paging response through the second SIM will reduce the service quality of the ongoing service of the first SIM, the multi-SIM terminal can determine not to perform the paging response. If the situation is contrary to the above situation, the multi-SIM terminal can determine that performing a paging response is needed.

In practical application, the multi-SIM terminal can also determine whether to perform a paging response in other ways, which is not limited in the present disclosure.

In step 102, in response to determining not to perform a paging response, target indication information is sent to the target base station.

In the embodiment of the present disclosure, the target indication information is for informing a network side that the second SIM has received the paging message, but does not perform a paging response.

In an example, the target indication information can be used for informing the network side that the multi-SIM terminal currently has one or more other SIMs conducting service communication, so the second SIM has received the paging message but does not perform a paging response.

In another example, target indication information can be used for informing the network side that the multi-SIM terminal is performing a service with a higher priority, so the second SIM has received the paging message but does not perform a paging response.

In another example, the network side can be directly informed through target indication information that the multi-SIM terminal is busy, so the second SIM has received the paging message but does not perform a paging response.

In the above examples, in the case of determining that the first SIM is in service communication and receiving the paging message for paging the second SIM in the inactive state, the multi-SIM terminal can send the target indication information to the target base station through the second SIM to inform the network side that the second SIM has received the paging message, but does not perform a paging response. Thus, avoiding triggering incorrect operations or error statistics on the network side, and avoiding the waste of signaling resources caused by the target base station repeatedly paging the second SIM in the inactive state without receiving a paging response.

In an example, for the above step 102, the target indication information can be sent to the target base station through the second SIM in any one of the following ways.

In a first way, the target indication information can be sent to the target base station by the second SIM through first radio resource control (RRC) signaling.

In the embodiment of the present disclosure, the first RRC signaling may include, but is not limited to, RRCResumeRequest signaling.

Further, after adding the target indication information to an original first information unit or a newly added second information unit of the first RRC signaling by the second SIM, the first RRC signaling added with the target indication information can be sent to the target base station by the second SIM. The original first information unit includes but is not limited to a resumeCause information unit in the RRCResumeRequest signaling. The newly added second information unit can be a newly added information unit corresponding to the target indication information in the RRCResumeRequest signaling.

In a second way, the target indication information can be sent to the target base station by the second SIM through second RRC signaling.

In the embodiment of the present disclosure, the second RRC signaling may include, but is not limited to, RRCResumeComplete signaling.

Further, after adding the target indication information to an original third information unit or a newly added fourth information unit of the second RRC signaling by the second SIM, the second RRC signaling added with the target indication information can be sent to the target base station by the second SIM. The original third information unit includes but is not limited to an existing information unit in the RRCResumeComplete signaling. The newly added fourth information unit can be a newly added information unit corresponding to the target indication information in the RRCResumeComplete signaling.

In a third way, a reserved preamble as the target indication information and identification information of the second SIM can be sent to the target base station by the second SIM.

In the embodiment of the present disclosure, any one of reserved preambles can be taken as the target indication information, and the reserved preamble as the target indication information and the identification information of the second SIM can be sent to the target base station through the second SIM. After receiving the reserved preamble and the identification information of the second SIM, the target base station can determine which SIM has received the paging message, but does not perform a paging response.

In an example, there may be one or more reserved preambles, which may not be used for random access and only serve as the target indication information.

The reserved preambles can be preconfigured by the target base station for the second SIM. After receiving at least one reserved preamble configured by the target base station, the second SIM can select any one as the target indication information. Or, the reserved preambles can be pre-defined in a protocol, and the second SIM can determine the reserved preambles defined in the protocol based on predefined settings, and then select one of them as the target indication information.

In the above embodiment, after determining that no paging response is required, the target indication information can be sent to the target base station through the second SIM in any one of the above ways, so as to inform the network side that the second SIM has received a paging message but does not perform a paging response. Triggering of incorrect operations or error statistics on the network side can be avoided, and the waste of signaling resources caused by the target base station repeatedly paging the second SIM in the inactive state without receiving a paging response can be avoided.

Next, the methods for sending information provided by the embodiments of the present disclosure will be introduced from a target base station side.

Figure 2:
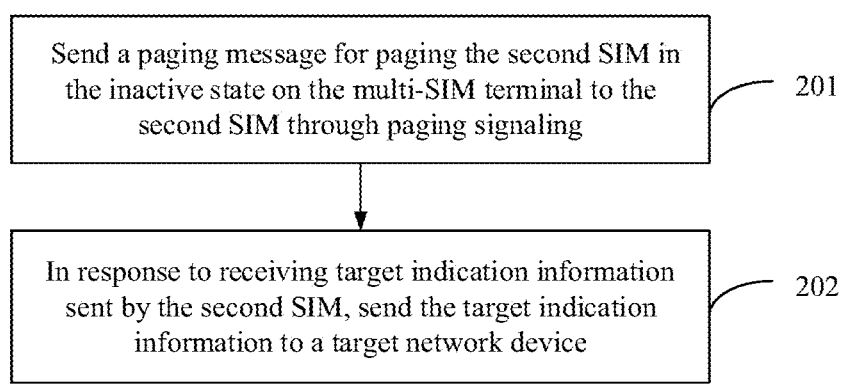
FIG. 2 is a flowchart illustrating another method for sending information according to an exemplary embodiment.

An embodiment of the present disclosure provides another method for sending information, as shown in FIG. 2. FIG. 2 is a flowchart of another method for sending information according to an embodiment, which can be applied to a target base station. The target base station is a base station covering an area where a second SIM in an inactive state on a multi-SIM terminal is currently located. The method can include the following steps 201 and 202.

In step 201, a paging message for paging the second SIM in the inactive state on the multi-SIM terminal is sent to the second SIM through paging signaling.

In the embodiment of the present disclosure, the target base station can directly send the paging message for paging the second SIM through the paging signaling.

In step 202, in response to receiving target indication information sent by the second SIM, the target indication information is sent to a target network device.

In the embodiment of the present disclosure, the target network device can refer to an anchor base station corresponding to the second SIM, or a core network device corresponding to the second SIM. The anchor base station is the last base station that provides services for the second SIM before the second SIM switches to the inactive state.

In an example, the target indication information is used to indicate at least one of the following: one or more other SIMs are in service communication on the multi-SIM terminal; the multi-SIM terminal is performing a service with a higher priority; or the multi-SIM terminal is busy.

In the above embodiment, the target base station can page the second SIM in the inactive state on the multi-SIM terminal through paging signaling. If the target base station receives the target indication information sent by the second SIM, the target base station can forward the target indication information to the target network device. The target indication information is used to inform a network side that the second SIM has received the paging message, but does not perform a paging response. The waste of signaling resources caused by the target base station repeatedly paging the second SIM without receiving a paging response can be avoided, triggering of incorrect operations or error statistics on the network side can be avoided, and the usability is high.

In an example, the target base station can be different from the anchor base station. For example, the anchor base station, assuming that it is base station #1, provides services for the second SIM at last before the second SIM switches to the inactive state. After the second SIM switches to the inactive state, if the location of the second SIM (the multi-SIM terminal) changes and is currently within the coverage of the target base station, assuming that it is base station #2, the target base station and the anchor base station are two different base stations.

Correspondingly, the above step 201 can include: in response to receiving radio access network (RAN) paging signaling for paging the second SIM sent by the anchor base station, the paging message is sent to the second SIM through the paging signaling.

In the embodiment of the present disclosure, the target base station can receive the RAN paging signaling sent by the anchor base station, and then send the paging signaling to the second SIM based on the RAN paging signaling.

Correspondingly, the target network device at this time is the anchor base station, and step 202 can include: based on a preset interface between base stations, the target indication information is sent to the anchor base station through target signaling.

In the embodiment of the present disclosure, based on the preset interface between base stations, including but not limited to an X2 interface or an Xn interface, the target base station can send the target indication information to the anchor base station through the target signaling. The target signaling includes but is not limited to RETRIEVE UE CONTAXT REQUEST signaling.

In an example, the target base station can add the target indication information to an existing fifth information unit or a newly added sixth information unit in the RETRIEVE UE CONTAXT REQUEST signaling, and then send the RETRIEVE UE CONTAXT REQUEST signaling added with the target indication information to the anchor base station.

In the above embodiment, if the target base station is different from the anchor base station corresponding to the second SIM, the anchor base station can send RAN paging signaling to the target base station. After receiving the RAN paging signaling, the target base station can send the paging signaling to the second SIM. Further, after receiving the target indication information sent by the second SIM, the target base station can forward the target indication information to the anchor base station, which will then forward the target indication information to the core network device. Therefore, triggering of incorrect operations or error statistics on the network side can be avoided, and the waste of signaling resources caused by the target base station repeatedly paging the second SIM in the inactive state without receiving a paging response can be avoided.

In an example, if the target base station is the same as the anchor base station, for example, the anchor base station provides services for the second SIM at last before the second SIM switches to the inactive state. After the second SIM switches to the inactive state, if the location of the second SIM (the multi-SIM terminal) does not change, or the location of the second SIM changes and is currently within the coverage of the anchor base station, the anchor base station and the target base station are the same station.

Correspondingly, step 201 can include: in response to determining that the core network device has data to be sent to the second SIM, the paging message is sent to the second SIM through the paging signaling.

In the embodiment of the present disclosure, when it is determined that the core network device has data to be sent to the second SIM, the target base station, that is, the anchor base station, can directly send the paging signaling to the second SIM.

Correspondingly, the target network device includes the core network device, and step 202 can include: the target indication information is sent to the core network device through a preset interface between the target base station and the core network device.

In the embodiment of the present disclosure, the target base station, that is, the anchor base station, can send the target indication information to the core network device through a preset interface between the target base station and the core network device, including but not limited to a NG interface.

In the above embodiment, if the target base station is the same as the anchor base station corresponding to the second SIM, the target base station can directly send the paging signaling to the second SIM. Further, after receiving the target indication information sent by the second SIM, the target base station can send the target indication information to the core network device. Thus avoiding triggering of incorrect operations or error statistics on the network side, and avoiding the waste of signaling resources caused by the target base station repeatedly paging the second SIM in the inactive state without receiving a paging response.

Figure 3:
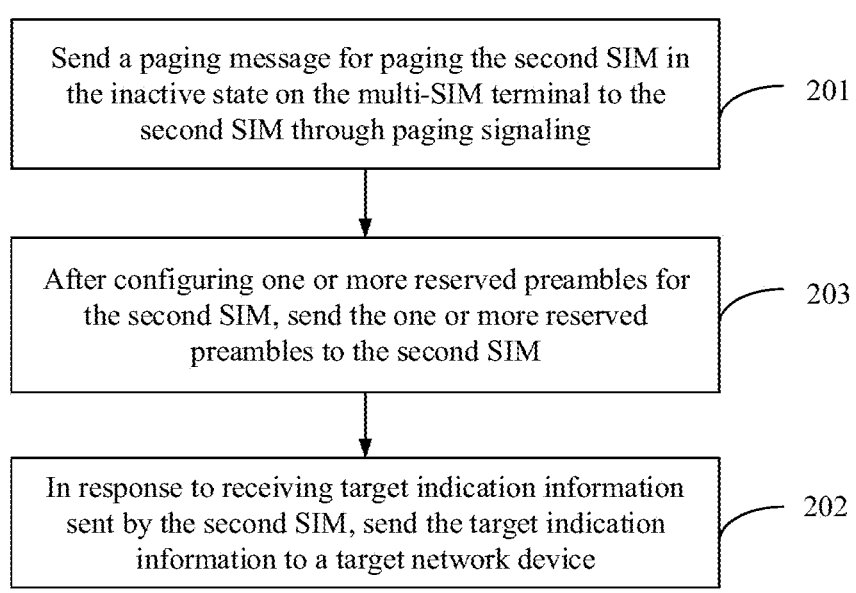
FIG. 3 is a flowchart illustrating yet another method for sending information according to an exemplary embodiment.

In an example, referring to FIG. 3, which is a flowchart of another method for sending information according to the embodiment shown in FIG. 2. Before step 202, the method may further include step 203.

In step 203, after configuring one or more reserved preambles for the second SIM, the one or more reserved preambles are sent to the second SIM.

In the embodiment of the present disclosure, at least one reserved preamble can be preconfigured by the target base station for the second SIM, and the configured at least one reserved preamble can be sent to the second SIM by the target base station. In this way, the second SIM can select any one of the at least one reserved preamble configured by the target base station as the target indication information, and send the target indication information and identification information of the second SIM to the target base station. Thereby informing the target base station that the second SIM has received the paging message, but does not perform a paging response.

In the above embodiment, the target base station can preconfigure one or more reserved preambles for the second SIM, so that the second SIM can take one of the reserved preambles as the target indication information, which is simple and convenient to implement and has high usability.

Next, the methods for sending information provided in the present disclosure will be introduced from an anchor base station side.

Figure 4:
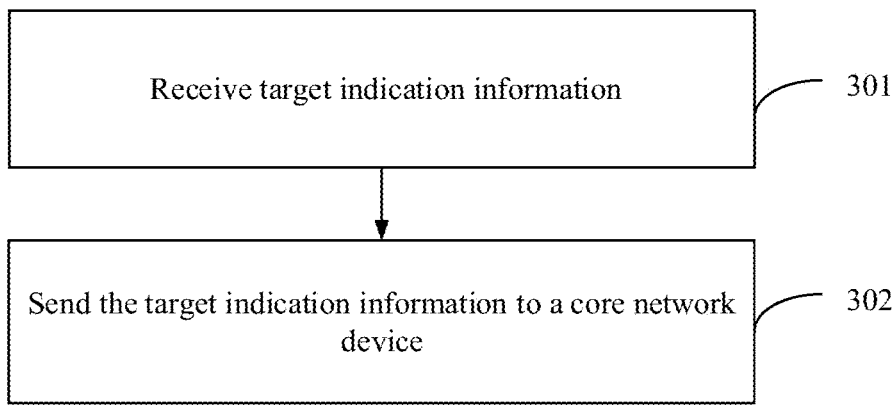
FIG. 4 is a flowchart illustrating yet another method for sending information according to an exemplary embodiment.

An embodiment of the present disclosure provides another method for sending information, as shown in FIG. 4. FIG. 4 is a flowchart of another method for sending information according to an embodiment, which can be applied to an anchor base station corresponding to a second SIM in an inactive state on a multi-SIM terminal. The anchor base station is the last base station that provides services for the second SIM before the second SIM in the inactive state on the multi-SIM terminal switches to the inactive state. The method may include the following steps 301 and 302.

In step 301, target indication information is received.

In the embodiment of the present disclosure, the anchor base station can receive the target indication information sent by the second SIM or a target base station, where the target base station is a base station covering an area where the second SIM is currently located. The target indication information can be used to indicate at least one of the following: one or more other SIMs are in service communication on the multi-SIM terminal; the multi-SIM terminal is performing a service with a higher priority; or the multi-SIM terminal is busy.

In step 302, the target indication information is sent to a core network device.

In the embodiment of the present disclosure, after receiving the target indication information, the anchor base station can send the target indication information to the core network device through a preset interface between the anchor base station and the core network device, including but not limited to a NG interface.

In the above embodiment, after receiving the target indication information, the anchor base station corresponding to the second SIM can send the target indication information to the core network device, so that the core network device can determine that the second SIM has received a paging message, but does not perform a paging response. Thereby avoiding triggering incorrect operations or error statistics on the network side and avoiding the waste of signaling resources caused by the target base station repeatedly paging the second SIM in the inactive state without receiving a paging response.

In an example, if the second SIM is currently within the coverage of the anchor base station, that is, the anchor base station corresponding to the second SIM is the same as the target base station, step 301 can include: the target indication information sent by the second SIM is received.

In the case where the anchor base station is the same as the target base station, the anchor base station can directly receive the target indication information sent by the second SIM.

Figure 5:
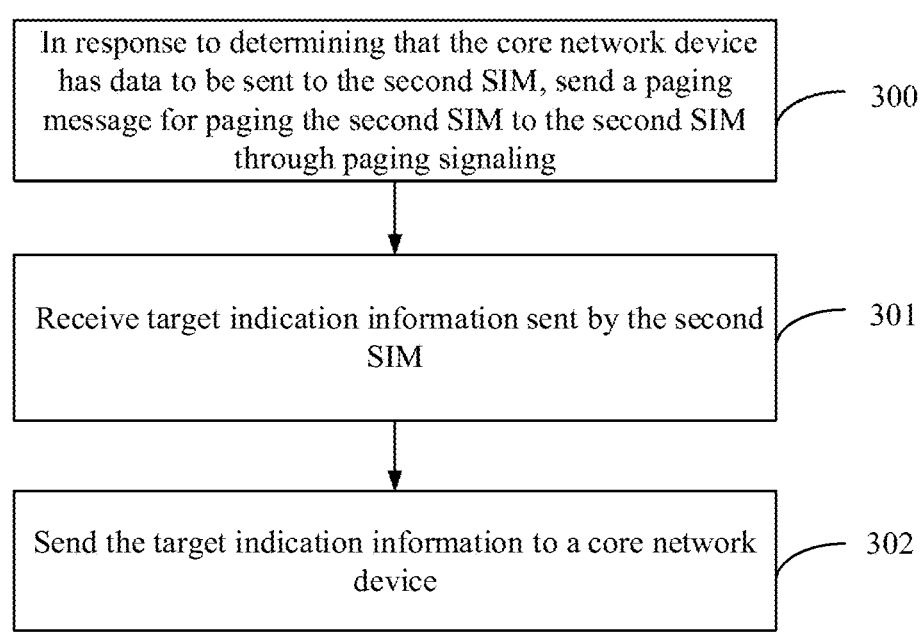
FIG. 5 is a flowchart illustrating yet another method for sending information according to an exemplary embodiment.

Correspondingly, referring to FIG. 5, which is a flowchart of another method for sending information according to the embodiment shown in FIG. 4. Before step 301, the method may further include step 300.

In step 300, in response to determining that the core network device has data to be sent to the second SIM, a paging message for paging the second SIM is sent to the second SIM through paging signaling.

In the embodiment of the present disclosure, in the case where the anchor base station is the same as the target base station, when it is determined that the core network device has the data to be sent to the second SIM, the anchor base station can directly send the paging message to the second SIM through the paging signaling, thereby paging the second SIM.

In the above embodiment, in the case where the anchor base station and the target base station are the same, the anchor base station can send the paging signaling to the second SIM. After determining not to perform a paging response, the second SIM can directly send the target indication information to the anchor base station, which is simple and convenient to implement and has high usability.

In an example, if the second SIM is currently within coverage of a target base station different from the anchor base station, that is, the anchor base station corresponding to the second SIM is different from the target base station, correspondingly, step 301 may include: the target indication information sent by the target base station is received.

In the embodiment of the present disclosure, in the case where the anchor base station is different from the target base station, the second SIM will send the target indication information to the target base station, and the target base station will then forward the target indication information to the anchor base station through an interface between base stations.

Figure 6:
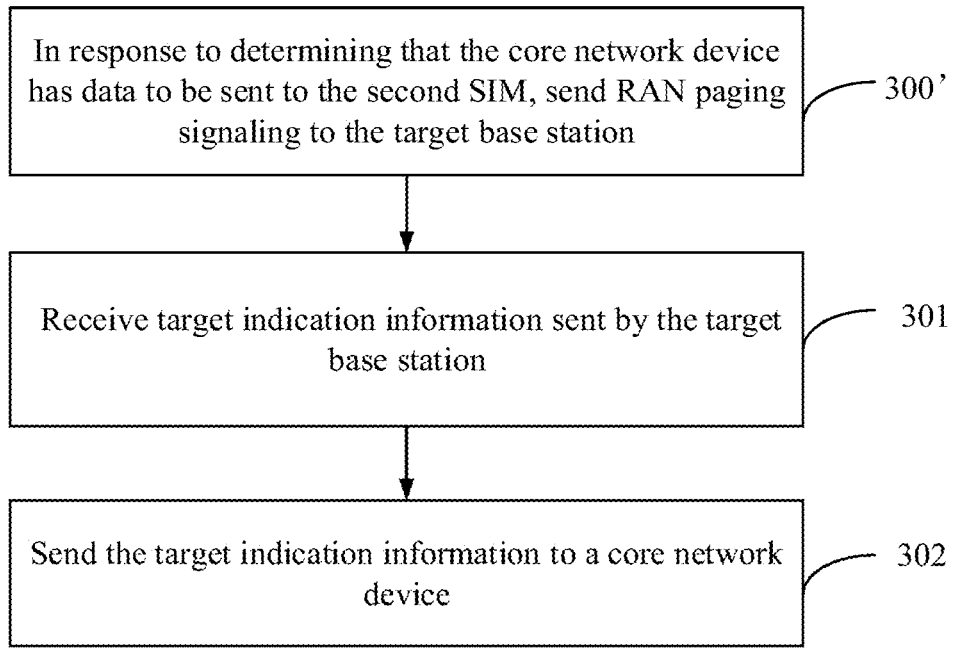
FIG. 6 is a flowchart illustrating yet another method for sending information according to an exemplary embodiment.

Correspondingly, referring to FIG. 6, which is a flowchart of another method for sending information according to the embodiment shown in FIG. 4. Before step 301, the method may further include step 300'.

In step 300', in response to determining that the core network device has data to be sent to the second SIM, RAN paging signaling is sent to the target base station.

In the embodiment of the present disclosure, in the case where the anchor base station is different from the target base station, the anchor base station needs to send the RAN paging signaling to the target base station when it is determined that the core network device has the data to be sent to the second SIM. After receiving the RAN paging signaling, the target base station will send paging signaling to the second SIM.

In the above embodiment, in the case where the anchor base station is different from the target base station, the anchor base station can send the RAN paging signaling to the target base station. After receiving the RAN paging signaling, the target base station can send the paging signaling to the second SIM. After determining not to perform a paging response, the second SIM can send the target indication information to the target base station, and the target base station can forward the target indication information to the anchor base station, which is simple and convenient to implement and has high usability. Next, the methods for sending information provided in the present disclosure will be introduced from a core network device side.

An embodiment of the present disclosure provides another method for sending information, which can be applied to a core network device. The method can include the following steps.

Figure 7:
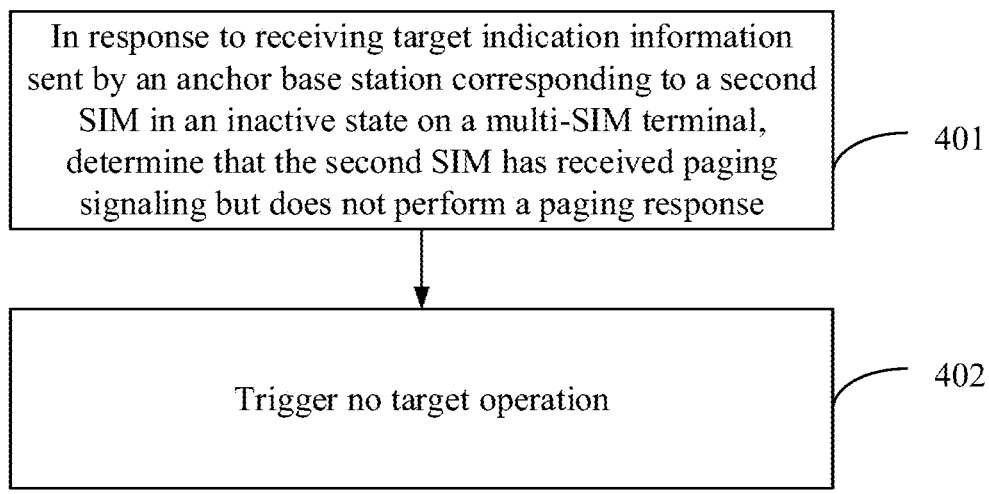
FIG. 7 is a flowchart illustrating yet another method for sending information according to an exemplary embodiment.

In an example, referring to FIG. 7, which is a flowchart of another method for sending information according to an embodiment, may include steps 401 and 402.

In step 401, in response to receiving target indication information sent by an anchor base station corresponding to a second SIM in an inactive state on a multi-SIM terminal, it is determined that the second SIM has received paging signaling but does not perform a paging response.

In the embodiment of the present disclosure, the anchor base station is the last base station that provides services for the second SIM before the second SIM switches to the inactive state. The target indication information is used to indicate at least one of the following: one or more other SIMs are in service communication on the multi-SIM terminal; the multi-SIM terminal is performing a service with a higher priority; or the multi-SIM terminal is busy.

In the above embodiment, based on the received target indication information, the core network device can determine that the second SIM in the inactive state on the multi-SIM terminal has received a paging message, but does not perform a paging response, the usability is high.

In step 402, a target operation is not triggered.

In the embodiment of the present disclosure, the target operation is not triggered, including at least one of the following: the operation of determining that the second SIM is in a closed state is not triggered; the operation of determining that there is a change in a tracking area where the second SIM is located is not triggered; or the operation of paging the second SIM again is not triggered within a target duration. That is, after receiving the target indication information, the core network device will not trigger the operation of believing that the second SIM has been closed, and/or will not trigger the operation of believing that the tracking area of the second SIM has changed. In addition, the core network device will not continue to page the second SIM within the target duration.

In the above embodiment, based on the received target indication information, the core network device can determine that the second SIM has received the paging message, but does not perform a paging response. Thus, avoiding triggering incorrect operations or error statistics on the network side, and avoiding the waste of signaling resources caused by the target base station repeatedly paging the second SIM in the inactive state without receiving a paging response.

Figure 8:
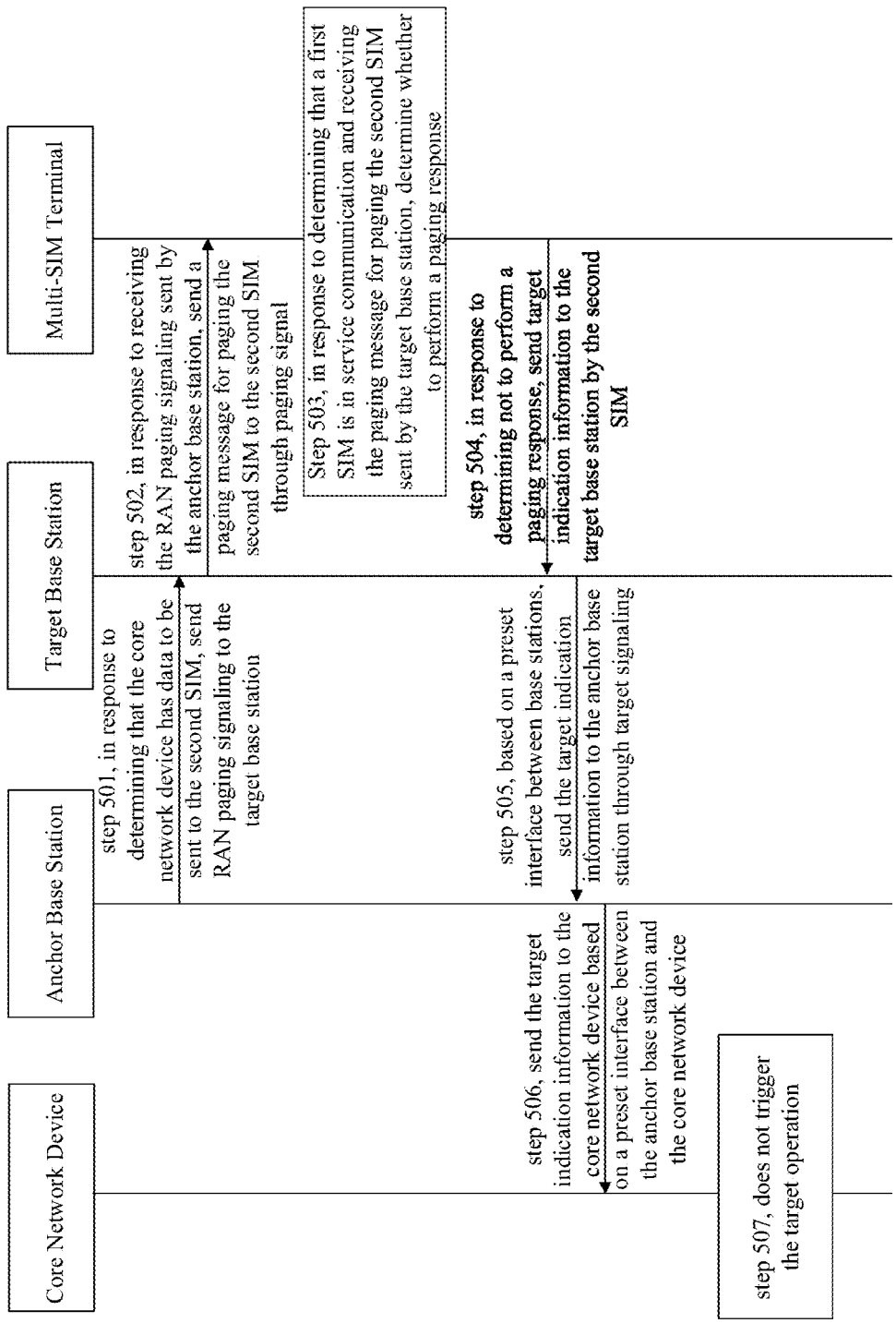
FIG. 8 is a flowchart illustrating yet another method for sending information according to an exemplary embodiment.

In an example, referring to FIG. 8, which is a flowchart of another method for sending information according to an embodiment. In the case where the target base station and the anchor base station corresponding to the second SIM in the inactive state on the multi-SIM terminal are different, the method may include the following steps 501-507.

In step 501, in response to determining that the core network device has data to be sent to the second SIM, the anchor base station sends RAN paging signaling to the target base station.

In step 502, in response to receiving the RAN paging signaling sent by the anchor base station, the target base station sends a paging message for paging the second SIM to the second SIM through paging signal.

In step 503, in response to determining that a first SIM is in service communication and receiving the paging message for paging the second SIM sent by the target base station, the multi-SIM terminal determines whether to perform a paging response.

In step 504, in response to determining not to perform a paging response, the multi-SIM terminal sends target indication information to the target base station by the second SIM.

In step 505, based on a preset interface between base stations, the target base station sends the target indication information to the anchor base station through target signaling.

In step 506, the anchor base station sends the target indication information to the core network device based on a preset interface between the anchor base station and the core network device.

In step 507, the core network device does not trigger the target operation.

In the above embodiment, the target indication information can be sent through the second SIM in the inactive state on the multi-SIM terminal, so as to inform the network side that the second SIM has received a paging message but does not perform a paging response. Thus avoiding triggering incorrect operations or error statistics on the network side, and avoiding the waste of signaling resources caused by the target base station repeatedly paging the second SIM in the inactive state without receiving a paging response.

Figure 9:
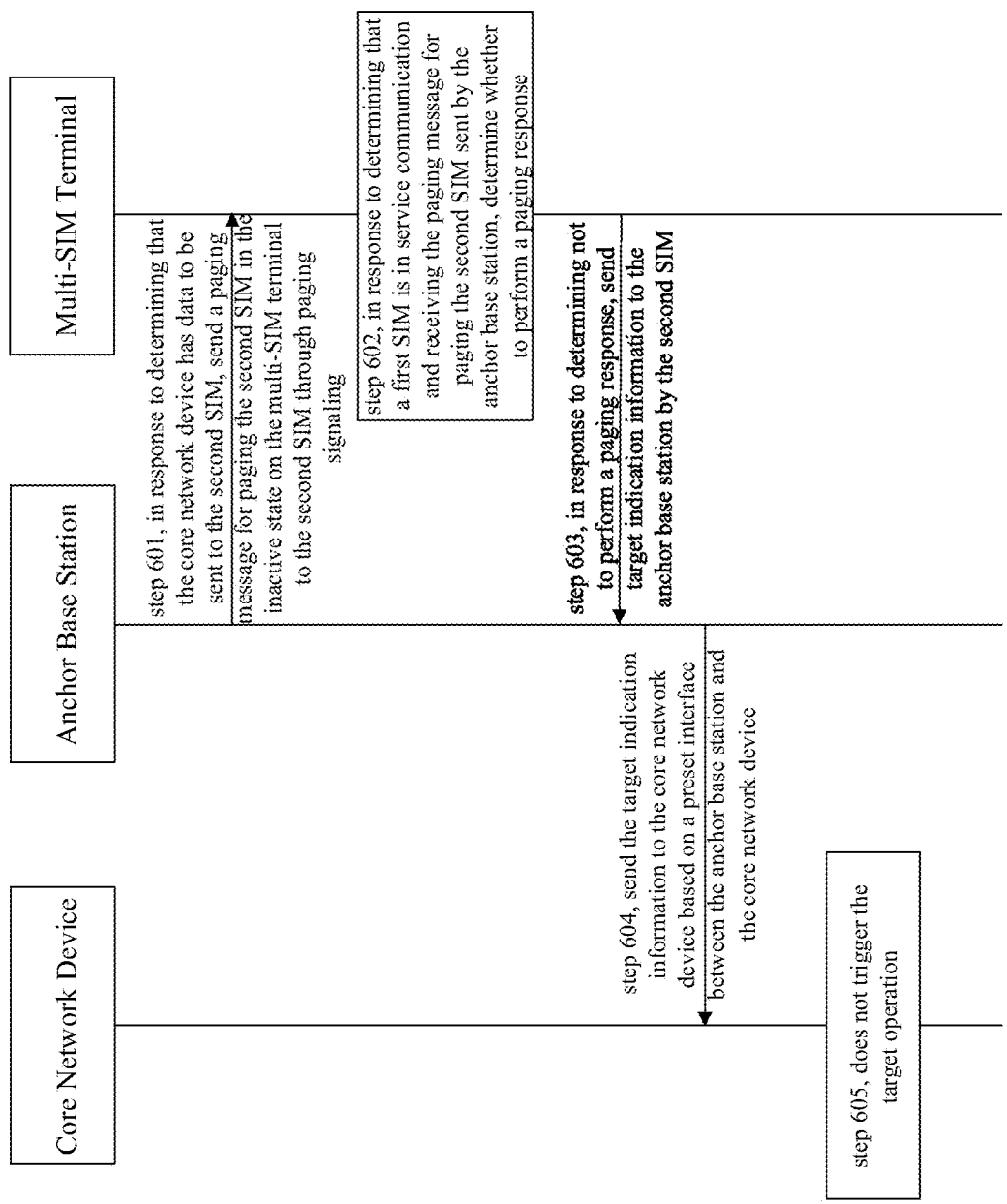
FIG. 9 is a flowchart illustrating yet another method for sending information according to an exemplary embodiment.

In an example, referring to FIG. 9, which is a flowchart of another method for sending information according to an embodiment. In the case where the target base station and anchor base station corresponding to the second SIM in the inactive state on the multi-SIM terminal are the same, the method may include the following steps 601-605.

In step 601, in response to determining that the core network device has data to be sent to the second SIM, the anchor base station sends a paging message for paging the second SIM in the inactive state on the multi-SIM terminal to the second SIM through paging signaling.

In step 602, in response to determining that a first SIM is in service communication and receiving the paging message sent by the anchor base station, the multi-SIM terminal determines whether to perform a paging response.

In step 603, in response to determining not to perform a paging response, the multi-SIM terminal sends target indication information to the anchor base station by the second SIM.

In step 604, the anchor base station sends the target indication information to the core network device based on a preset interface between the anchor base station and the core network device.

In step 605, the core network device does not trigger the target operation.

In the above embodiment, the target indication information can also be sent through the second SIM in the inactive state on the multi-SIM terminal, so as to inform the network side that the second SIM has received a paging message but does not perform a paging response, thus avoiding triggering incorrect operations or error statistics on the network side, and avoiding the waste of signaling resources caused by the target base station repeatedly paging the second SIM in the inactive state without receiving a paging response.

The above embodiments are further exemplified as follows.

Figure 10A:
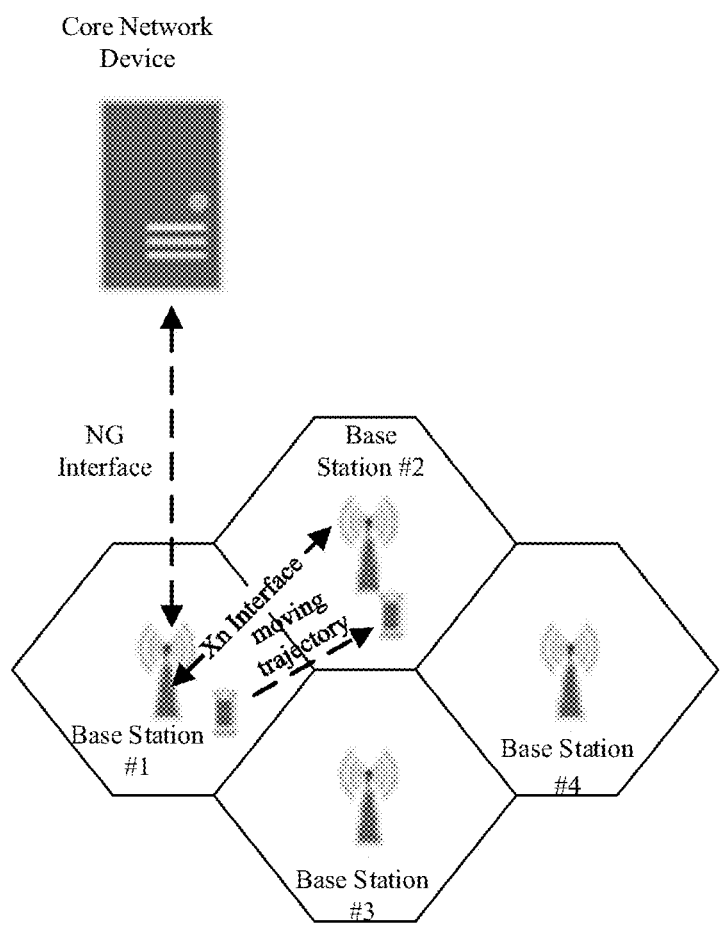
FIGS. 10A to 10B are schematic diagrams illustrating scenarios of methods for sending information according to an exemplary embodiment.

As shown in FIG. 10A, the multi-SIM terminal includes SIM #1 and SIM #2, where SIM #1 is in service communication and SIM #2 is in an inactive state. Base station #1 is the anchor base station corresponding to SIM #2. When the core network device has data to be sent to SIM #2, SIM #2 is within the coverage of base station #2, that is, base station #2 is the target base station corresponding to SIM #2.

Base station #1 can send RAN paging signaling to base station #2. After receiving the RAN paging signaling, base station #2 sends paging signaling to SIM #2. After determining not to perform a paging response, the multi-SIM terminal sends target indication information to base station #2 by SIM #2. Base station #2 sends the target indication information to base station #1 through an Xn interface, and base station #1 sends the target indication information to the core network device through a NG interface.

After receiving the target indication information, the core network device can determine that the second SIM has received the paging message, but does not perform a paging response, thereby avoiding triggering incorrect operations or error statistics, and avoiding the waste of signaling resources caused by the target base station repeatedly paging the second SIM in the inactive state without receiving the paging response.

Figure 10B:
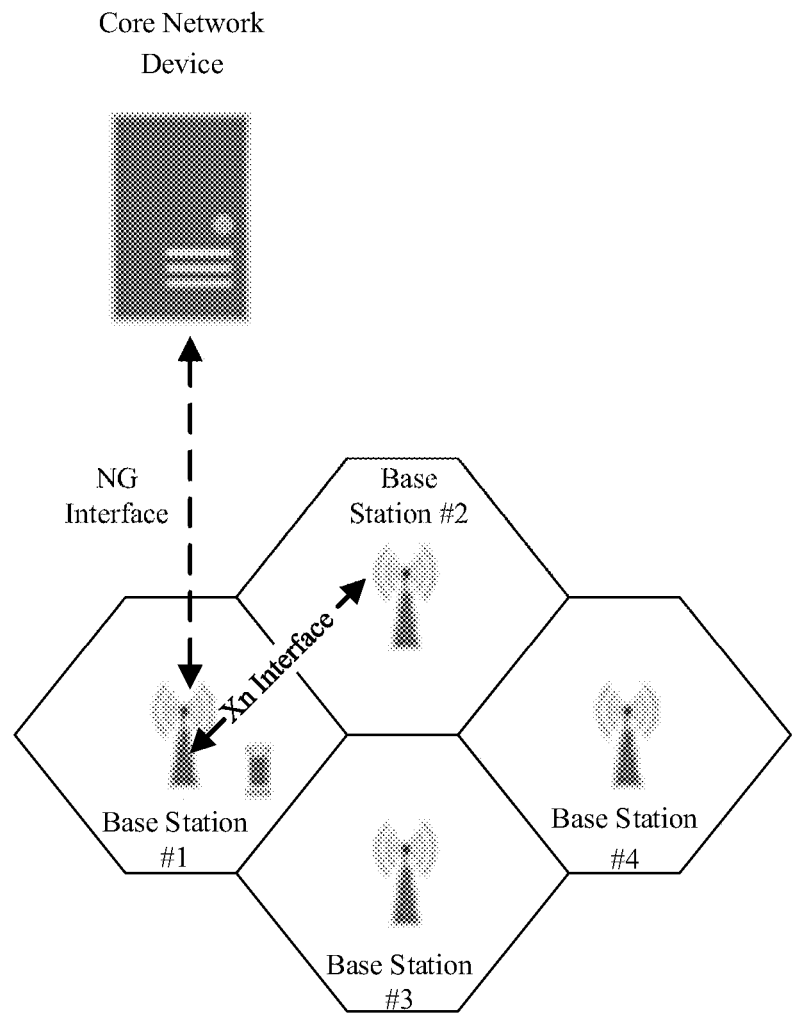

As shown in FIG. 10B, the multi-SIM terminal includes SIM #1 and SIM #2, where SIM #1 is in service communication and SIM #2 is in an inactive state. Base station #1 is the anchor base station corresponding to SIM #2. When the core network device has data to be sent to SIM #2, SIM #2 is within the coverage of base station #1, that is, base station #1 is also the target base station corresponding to SIM #2.

Base station #1 can send paging signaling to SIM #2. After determining not to perform a paging response, the multi-SIM terminal sends target indication information to base station #1 by SIM #2. Base station #1 then sends the target indication information to the core network device through a NG interface.

After receiving the target indication information, the core network device can determine that the second SIM has received the paging message, but does not perform a paging response. Thus, avoiding triggering incorrect operations or error statistics, and avoiding the waste of signaling resources caused by the target base station repeatedly paging the second SIM in the inactive state without receiving the paging response. Corresponding to the aforementioned embodiments of application function implementation methods, the present disclosure also provides embodiments of application function implementation apparatuses.

Figure 11:
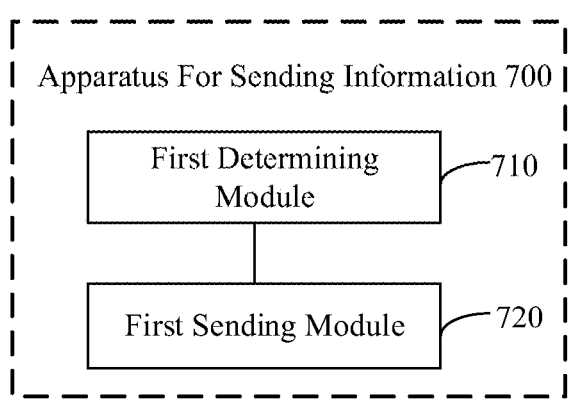
FIG. 11 is a block diagram illustrating an apparatus for sending information according to an exemplary embodiment.

Referring to FIG. 11, which is a block diagram of an apparatus for sending information[ED1] 700 according to an exemplary embodiment. The apparatus 700 is applied to a multi-SIM terminal and includes a first determining module 710 and a first sending module 720.

The first determining module 710, is configured to, in response to determining that a first subscriber identity module (SIM) is in service communication and receiving a paging message for paging a second SIM in an inactive state sent by a target base station through paging signaling, determine whether to perform a paging response; where the target base station is a base station covering an area where the second SIM is currently located.

The first sending module 720, is configured to, in response to determining not to perform a paging response, send target indication information to the target base station by the second SIM; where the target indication information is for informing a network side that the second SIM has received the paging message, but does not perform a paging response.

Figure 12:
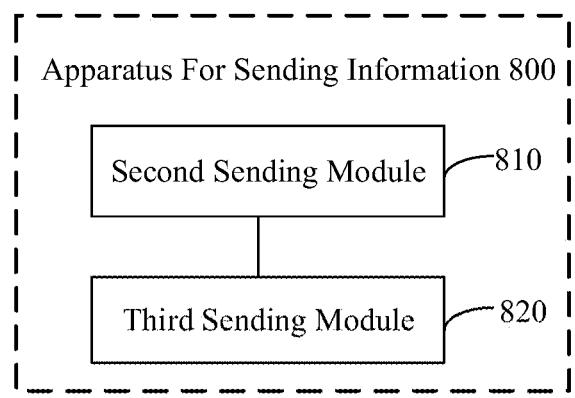
FIG. 12 is a block diagram illustrating another apparatus for sending information according to an exemplary embodiment.

Referring to FIG. 12, which is a block diagram of an apparatus for sending information[ED2] 800 according to an exemplary embodiment. The apparatus 800 is applied to a target base station, which is a base station covering an area where a second subscriber identity module (SIM) in an inactive state on a multi-SIM terminal is currently located. The apparatus 800 includes a second sending module 810 and a third sending module 820.

The second sending module 810 is configured to send a paging message for paging the second SIM in the inactive state on the multi-SIM terminal to the second SIM through paging signaling.

The third sending module 820 is configured to, in response to receiving target indication information sent by the second SIM, send the target indication information to a target network device. Where the target indication information is for informing a network side that the second SIM has received the paging message, but does not perform a paging response.

Figure 13:
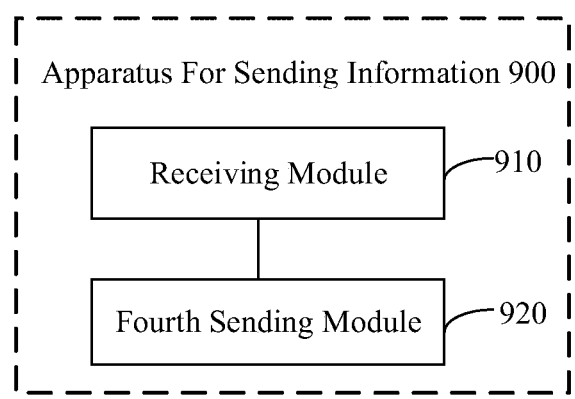
FIG. 13 is a block diagram illustrating yet another apparatus for sending information according to an exemplary embodiment.

Referring to FIG. 13, which is a block diagram of an apparatus[ED3] for sending information 900 according to an exemplary embodiment. The apparatus 900 is applied to an anchor base station corresponding to a second subscriber identity module (SIM) in an inactive state on a multi-SIM terminal. The apparatus 900 includes a receiving module 910 and a fourth sending module 920.

The receiving module 910 is configured to receive target indication information; where the target indication information is for informing a network side that the second SIM has received the paging message, but does not perform a paging response.

The fourth sending module 920 is configured to send the target indication information to a core network device.

Figure 14:
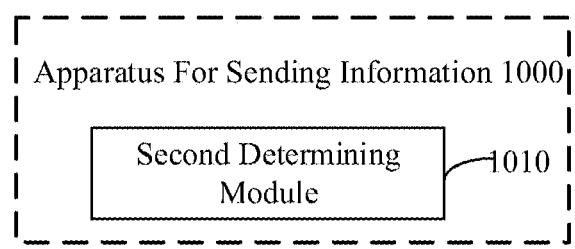
FIG. 14 is a block diagram illustrating yet another apparatus for sending information according to an exemplary embodiment.

Referring to FIG. 14, which is a block diagram of an apparatus [ED4] for sending information 1000 according to an exemplary embodiment. The apparatus 1000 is applied to a core network device and includes a second determining module 1010.

The second determining module 1010 is configured to, in response to receiving target indication information sent by an anchor base station corresponding to a second subscriber identity module (SIM) in an inactive state on a multi-SIM terminal, determine that the second SIM has received paging signaling but does not perform a paging response.

Since apparatus embodiments correspond to method embodiments, the description of method embodiments can be made, by reference, for relevant information. The apparatus embodiments described above are only schematic, where the above units described as separate components may or may not be physically separated, and the components displayed as units may or may not be physical units, for example, they can be located in one place or distributed to multiple network units. Some or all of the modules can be selected according to actual needs to achieve the purpose of the solution in the present disclosure. Ordinary technical personnel in the art can understand and implement without creative labor.

Correspondingly, the present disclosure also provides a computer readable storage medium, which stores a computer program for performing any one of the methods for sending information described above for a multi-SIM terminal side.

Correspondingly, the present disclosure also provides a computer readable storage medium, which stores a computer program for performing any one of the methods for sending information described above for a base station side. The base station side can refer to an anchor base station or a target base station, and the anchor base station and the target base station can be the same or different.

Correspondingly, the present disclosure also provides a computer readable storage medium, which stores a computer program for performing any one of the methods for sending information described above for a core network device side.

Correspondingly, the present disclosure also provides an apparatus for sending information, including: a processor; and a memory configured to store instructions executable by the processor; where the processor is configured to perform any one of the methods for sending information for a multi-SIM terminal side.

Figure 15:
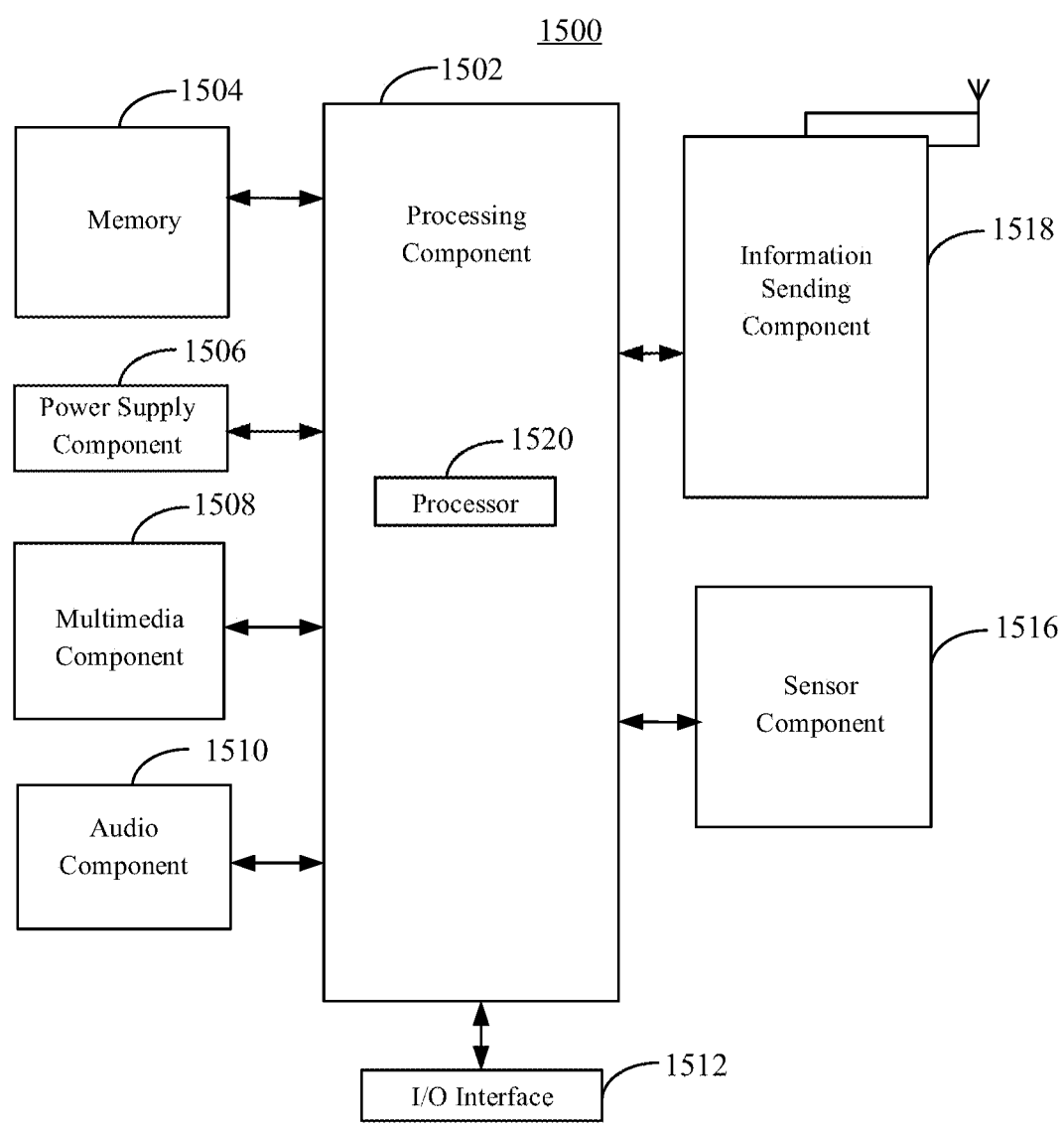
FIG. 15 is a schematic structural diagram illustrating an apparatus for sending information according to an exemplary embodiment of the present disclosure.

FIG. 15 is a block diagram of an electronic device 1500 according to an exemplary embodiment. For example, the electronic device 1500 can be a multi-SIM terminal including a plurality of SIMs, such as a mobile phone, a tablet computer, an e-book reader, a multimedia player, a wearable device, a vehicle terminal, an iPad, a smart TV.

Referring to FIG. 15, the electronic device 1500 may include one or more of the following components: a processing component 1502, a memory 1504, a power supply component 1506, a multimedia component 1508, an audio component 1510, an input/output (I/O) interface 1512, a sensor component 1516 and an information sending component 1518.

The processing component 1502 generally controls overall operations of the electronic device 1500, such as operations associated with display, phone calls, data and information transmission, camera operations, and recording operations. The processing component 1502 may include one or more processors 1520 to execute instructions to complete all or part of the steps of the above methods for sending information. In addition, the processing component 1502 may include one or more modules which facilitate the interaction between the processing component 1502 and other components. For example, the processing component 1502 may include a multimedia module to facilitate the interaction between the multimedia component 1508 and the processing component 1502. For example, the processing component 1502 can read executable instructions from a memory to implement the steps of a method for sending information provided by the above embodiments.

The memory 1504 is configured to store various types of data to support the operation of the electronic device 1500. Examples of such data include instructions for any application or method operated on the electronic device 1500, contact data, phonebook data, messages, pictures, videos, and so on. The memory 1504 may be implemented by any type of volatile or non-volatile storage devices or a combination thereof, such as a Static Random Access Memory (SRAM), an Electrically Erasable Programmable Read Only Memory (EEPROM), an Erasable Programmable Read Only Memory (EPROM), a Programmable Read Only memory (PROM), a Read Only Memory (ROM), a magnetic memory, a flash memory, a magnetic or an optical disk.

The power supply component 1506 provides power to various components of the electronic device 1500. The power supply component 1506 may include a power management system, one or more power supplies, and other components associated with generating, managing, and distributing power for the electronic device 1500.

The multimedia component 1508 includes a screen providing an output interface between the electronic device 1500 and a user. In some embodiments, the multimedia component 1508 may include a front camera and/or a rear camera. The front camera and/or rear camera may receive external multimedia data when the electronic device 1500 is in an operating mode, such as a photographing mode or a video mode. Each of the front camera and the rear camera may be a fixed optical lens system or have focal length and optical zooming capability.

The audio component 1510 is configured to output and/or input an audio signal. For example, the audio component 1510 includes a microphone (MIC). When the electronic device 1500 is in an operating mode, such as a call mode, a recording mode, and a voice recognition mode, the MIC is configured to receive an external audio signal. The received audio signal may be further stored in the memory 1504 or sent via the information sending component 1518. In some embodiments, the audio component 1510 further includes a speaker to output an audio signal.

The I/O interface 1512 may provide an interface between the processing component 1502 and peripheral interface modules. The above peripheral interface modules may include a keyboard, a click wheel, buttons and so on. These buttons may include, but are not limited to, a home button, a volume button, a starting button and a locking button.

The sensor component 1516 includes one or more sensors to provide status assessments of various aspects for the electronic device 1500. For example, the sensor component 1516 may detect the on/off status of the electronic device 1500, and relative positioning of component, for example, the component is a display and a keypad of the electronic device 1500. The sensor component 1516 may also detect a change in position of the electronic device 1500 or a component of the electronic device 1500, a presence or absence of the contact between a user and the electronic device 1500, an orientation or an acceleration/deceleration of the electronic device 1500, and a change in temperature of the electronic device 1500. The sensor component 1516 may include a proximity sensor to detect the presence of a nearby object without any physical contact. The sensor component 1516 may further include an optical sensor, such as a Complementary Metal Oxide Semiconductor (CMOS) or Charge-coupled Device (CCD) image sensor which is used in imaging applications. In some embodiments, the sensor component 1516 may further include an acceleration sensor, a gyroscope sensor, a magnetic sensor, a pressure sensor, or a temperature sensor.

The information sending component 1518 is configured to facilitate wired or wireless information transmission between the electronic device 1500 and other devices. The electronic device 1500 may access a wireless network that is based on an information transmission standard, such as Wi-Fi, 2G, 3G, 4G, 5G, or 6G, or a combination thereof. In an exemplary embodiment, the information sending component 1518 receives a broadcast signal or broadcast-associated information from an external broadcast management system via a broadcast channel. In an exemplary embodiment, the information sending component 1518 further includes a Near Field Communication (NFC) module to facilitate short-range communications. For example, the NFC module may be implemented based on a Radio Frequency Identification (RFID) technology, an Infrared Data Association (IrDA) technology, an Ultra-Wide Band (UWB) technology, a Bluetooth (BT) technology and other technologies.

In an exemplary embodiment, the electronic device 1500 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components for performing the above methods for sending information.

In an exemplary embodiment, there is also provided a non-transitory computer readable storage medium including instructions, such as the memory 1504 including instructions. The instructions may be executed by the processor 1520 of the electronic device 1500 to perform the above methods for sending information. For example, the non-transitory computer readable storage medium may be a ROM, a Random Access Memory (RAM), a CD-ROM, a magnetic tape, a floppy disk, an optical data storage device, and the like.

Correspondingly, the present disclosure also provides an apparatus for sending information, including: a processor; a memory configured to store instructions executable by the processor; where the processor is configured to perform any one of the methods for sending information for a base station side described above.

Figure 16:
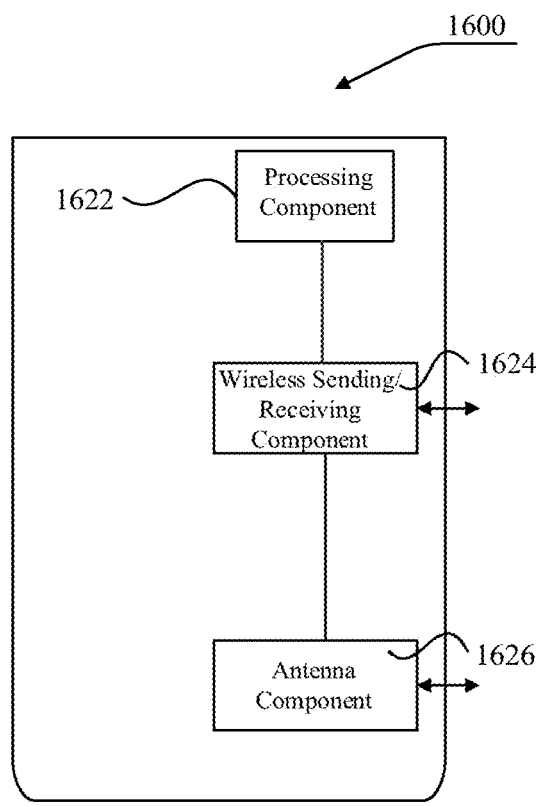
FIG. 16 is a schematic structural diagram illustrating another apparatus for sending information according to an exemplary embodiment of the present disclosure.

FIG. 16 is a structural schematic diagram of another apparatus for sending information 1600 according to an exemplary embodiment. The apparatus 1600 can be provided as a base station. Referring to FIG. 16, the apparatus 1600 includes a processing component 1622, a wireless sending/receiving component 1624, an antenna component 1626, and a signal processing portion unique to one or more wireless interfaces. The processing component 1622 may further include one or more processors.

One of the processors in processing component 1622 can be configured to perform any of the methods for sending information for a base station side described above.

Correspondingly, the present disclosure also provides an apparatus for sending information, including: a processor; a memory configured to store instructions executable by the processor; where the processor is configured to perform any one of the methods for sending information for a core network device side described above.

Figure 17:
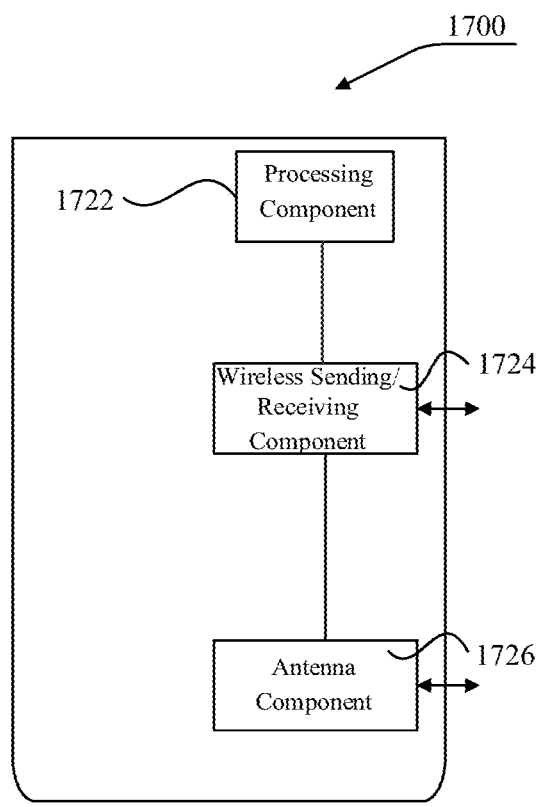
FIG. 17 is a schematic structural diagram illustrating yet another apparatus for sending information according to an exemplary embodiment of the present disclosure.

FIG. 17 is a structural schematic diagram of another apparatus for sending information 1700 according to an exemplary embodiment. The apparatus 1700 can be provided as a core network device. Referring to FIG. 17, the apparatus 1700 includes a processing component 1722, a wireless sending/receiving component 1724, an antenna component 1726, and a signal processing portion unique to one or more wireless interfaces. The processing component 1722 may further include one or more processors.

One of the processors in processing component 1722 can be configured to perform any of the methods for sending information for a core network device side described above.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the art that are not disclosed in the present disclosure. The specification and examples are considered as exemplary only, with a true scope and spirit of the present disclosure being indicated by the following claims.

It should be understood that the present disclosure is not limited to the above described structures shown in the drawings, and various modifications and changes can be made to the present disclosure without departing from the scope thereof. The scope of the present disclosure is to be limited only by the appended claims.

The invention claimed is:

1. A method for sending information, performed by a multi-subscriber identity module (SIM) wireless terminal, the method comprising:
    determining that a first SIM is in service communication;
    determining that a second SIM is in an inactive state;
    receiving a paging message for paging a second SIM in an inactive state sent by a target base station through paging signaling, wherein the target base station is a base station covering an area where the second SIM is currently located;
    determining not to perform a paging response; and
    in response to determining not to perform a paging response, sending target indication information to the target base station by the second SIM; wherein the target indication information is for informing a core network device through an anchor base station that the second SIM has received the paging message, but does not perform a paging response,
    wherein sending the target indication information to the target base station by the second SIM comprises:
        sending the target indication information to the target base station by the second SIM through first radio resource control (RRC) signaling.

2. The method according to claim 1, wherein sending the target indication information to the target base station by the second SIM through the first RRC signaling comprises:
    after adding the target indication information to an original first information unit or a newly added second information unit of the first RRC signaling by the second SIM, sending the first RRC signaling added with the target indication information to the target base station by the second SIM.

3. The method according to claim 1, wherein sending the target indication information to the target base station by the second SIM comprises:
    sending the target indication information to the target base station by the second SIM through second radio resource control (RRC) signaling.

4. The method according to claim 3, wherein sending the target indication information to the target base station by the second SIM through the second RRC signaling comprises:
    after adding the target indication information to an original third information unit or a newly added fourth information unit of the second RRC signaling by the second SIM, sending the second RRC signaling added with the target indication information to the target base station by the second SIM.

5. The method according to claim 1, wherein the target indication information comprises one of one or more reserved preambles;
    wherein sending the target indication information to the target base station by the second SIM comprises:
        sending the reserved preamble as the target indication information and identification information of the second SIM to the target base station by the second SIM.

6. The method according to claim 1, further comprising:
    receiving the one or more reserved preambles configured by the target base station for the second SIM; or
    determining the one or more reserved preambles based on predefined settings.

7. The method according to claim 1, wherein the target indication information is for indicating at least one of:
    one or more other SIMs are in service communication on the multi-SIM terminal;
    the multi-SIM terminal is performing a service with a higher priority; or the multi-SIM terminal is busy.

8. An apparatus for sending information, comprising:
    a processor; and
    a memory configured to store instructions executable by the processor;
    wherein the processor is configured to perform the method for sending information according to claim 1.

* * * * *